United States Patent [19]

Rakovsky

[11] 4,032,281

[45] June 28, 1977

[54] THERMOPLASTIC TUBULAR CONTAINER FORMING APPARATUS

[76] Inventor: Oscar Rakovsky, 37 Avenue Duquesne, Paris 7, France

[22] Filed: Dec. 26, 1974

[21] Appl. No.: 536,469

[30] Foreign Application Priority Data

Feb. 4, 1974 France ............................ 74.04746
May 31, 1974 France ............................ 74.19869

[52] U.S. Cl. ................................ 425/392; 425/384;
425/393; 425/402
[51] Int. Cl.² ..................... B29C 17/02; B29D 23/00
[58] Field of Search ............... 425/174, 174.4, 110,
425/114, 126, 383, 392, 393, 403, 402, 394,
396, 397, 325, DIG. 213, 123

[56] References Cited

UNITED STATES PATENTS

| 999,183 | 7/1911 | Philpot | 425/392 |
|---|---|---|---|
| 2,265,111 | 12/1941 | Brown | 425/392 |
| 2,408,596 | 10/1946 | Bednar et al. | 29/148.2 |
| 2,485,885 | 10/1949 | Hoopes | 425/392 |
| 2,876,496 | 3/1959 | Murphy | 264/294 |
| 3,042,965 | 7/1962 | Gray, Jr. et al. | 425/403 |
| 3,205,535 | 9/1965 | Niessner et al. | 425/393 X |
| 3,237,243 | 3/1966 | Saumsiegle et al. | 425/174 |
| 3,343,220 | 9/1967 | Martinek | 425/174 |
| 3,461,505 | 8/1969 | Schroeder et al | 425/392 |
| 3,475,786 | 11/1969 | Pearson | 425/393 X |
| 3,591,896 | 7/1971 | Tartaglia | 425/393 X |
| 3,692,889 | 9/1972 | Hetrich | 425/396 |
| 3,776,803 | 12/1973 | Kissell | 425/174 |
| 3,796,532 | 3/1974 | Needleman | 425/325 |
| 3,852,016 | 12/1974 | Delaugun | 425/393 |
| 3,910,744 | 10/1975 | Ronden et al. | 425/393 X |

FOREIGN PATENTS OR APPLICATIONS

| 1,401,171 | 4/1965 | France | 425/392 |
|---|---|---|---|
| 1,083,474 | 6/1954 | France | |
| 70-37,880 | 1/1970 | Japan | 425/325 |
| 621,564 | 10/1935 | Germany | 425/392 |
| 752,221 | 7/1956 | United Kingdom | 425/392 |
| 1,099,064 | 1/1968 | United Kingdom | |
| 1,181,979 | 2/1970 | United Kingdom | |

Primary Examiner—J. Howard Flint, Jr.
Attorney, Agent, or Firm—Larson, Taylor and Hinds

[57] ABSTRACT

A process and apparatus for making a container or like product having an end face and a tubular skirt extending from it. The container or like is made from a length of tubular thermoplastic material. This length is sleeved over a mandrel, with one end portion projecting from it. This end portion is heated to soften it, constricted inwardly and then moulded between the end of the mandrel and a presser cap. The end face may have a central hole or nozzle formed by moulding around a stem projecting from the end of the mandrel.

13 Claims, 14 Drawing Figures

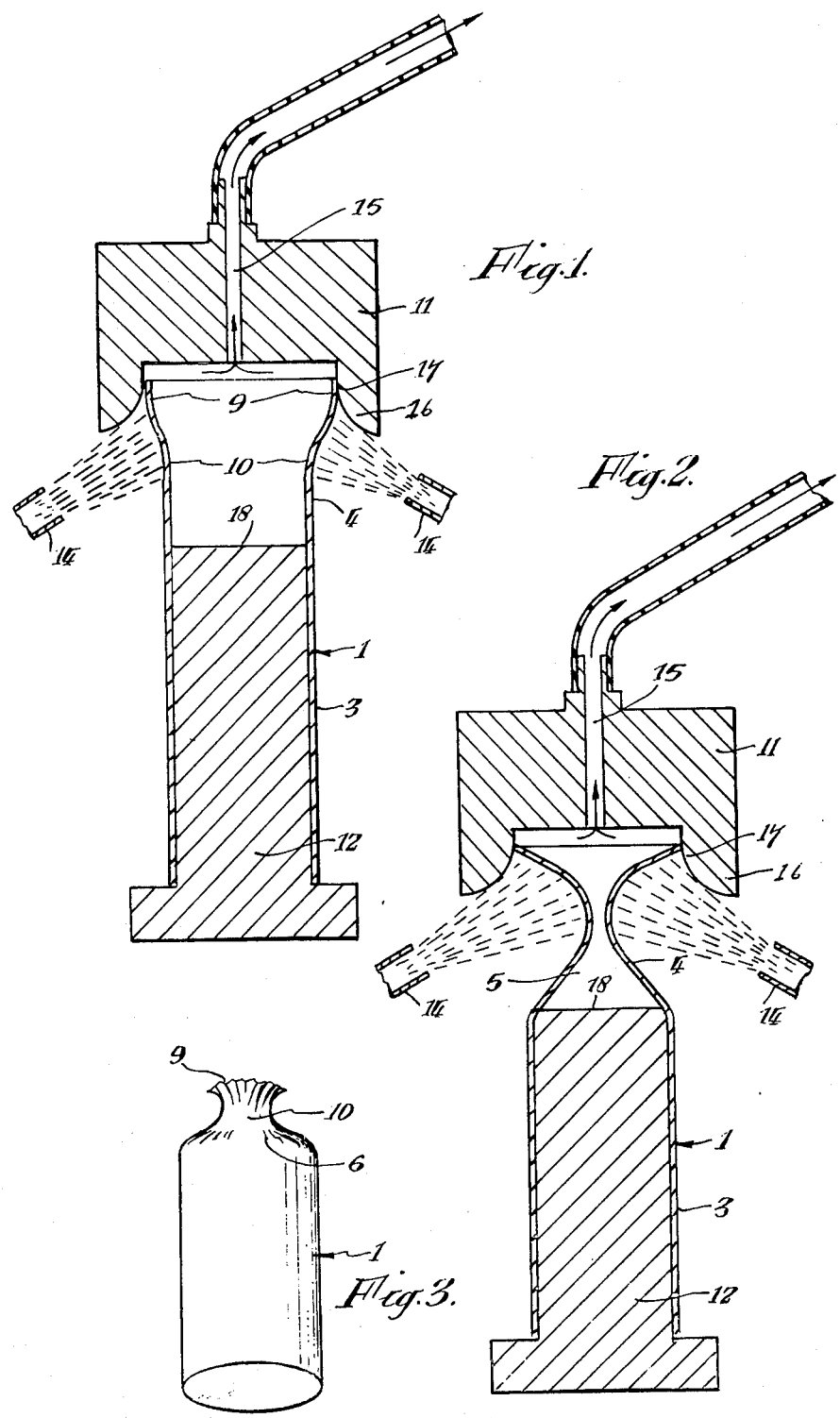

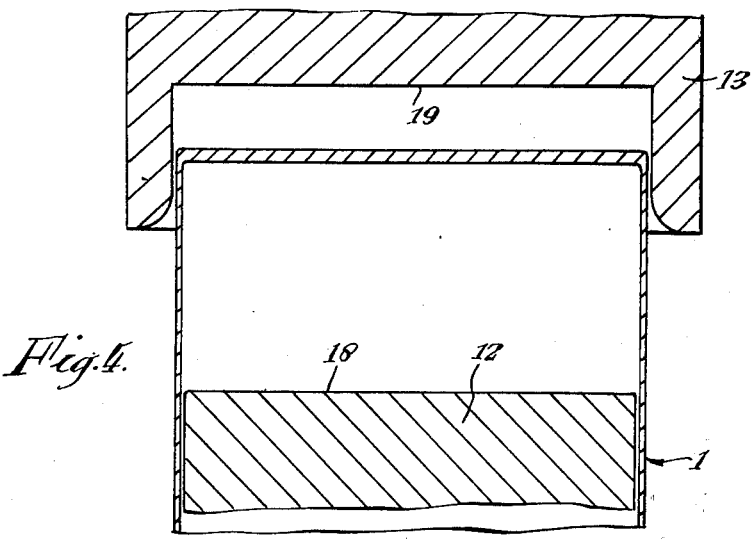
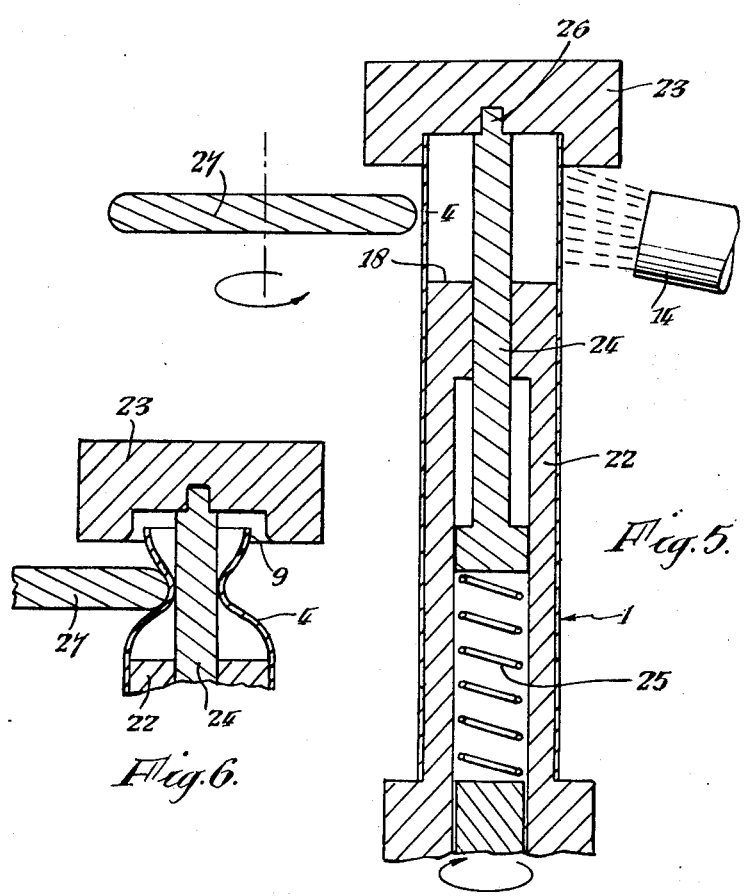

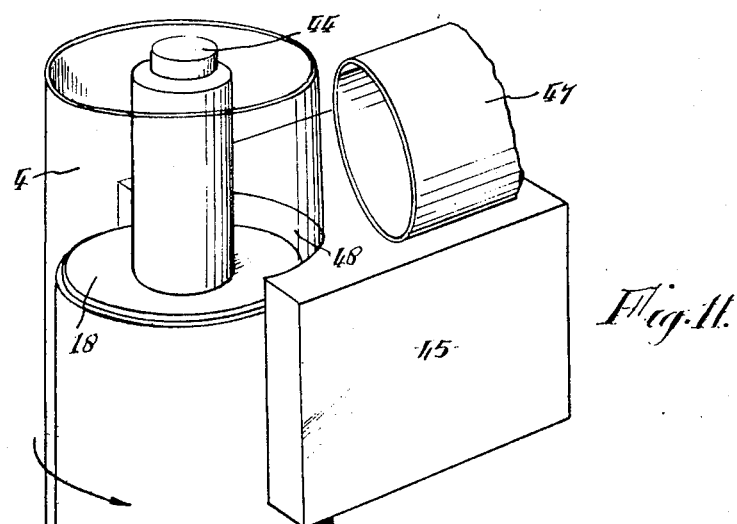
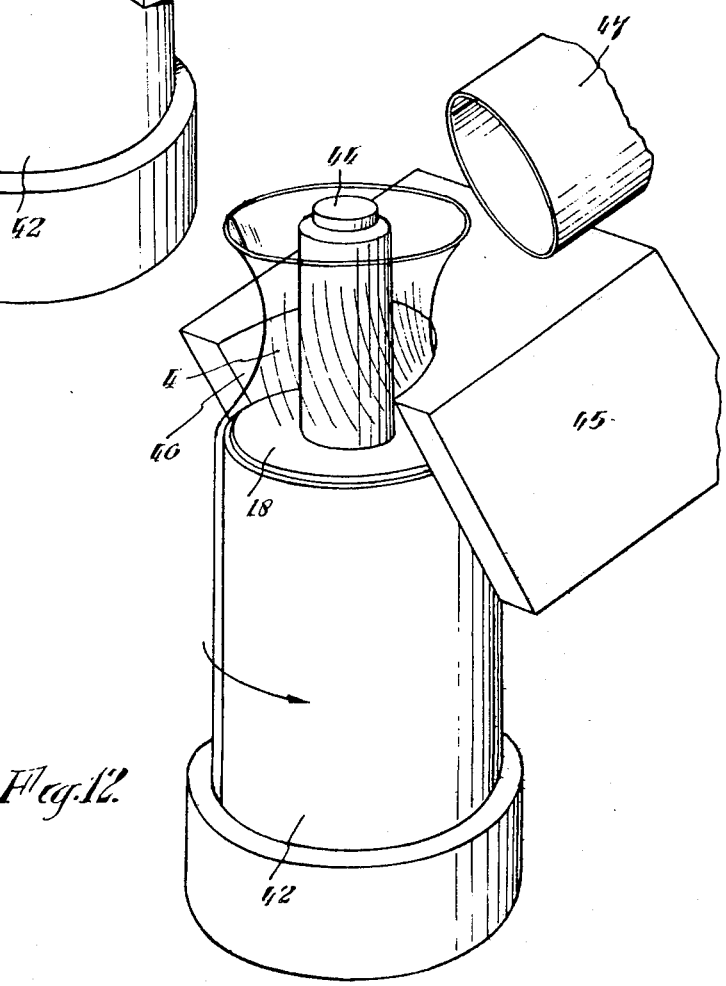

THERMOPLASTIC TUBULAR CONTAINER FORMING APPARATUS

This invention relates to containers and other like products (hereinafter called containers) formed from tubular lengths of thermoplastics material, and having an end face with a tubular body part or skirt depending therefrom. More specifically the invention relates to a process for the manufacture of such containers and to apparatus for carrying out the process.

The containers may have closed end faces, or the end faces may have a nozzle formed on them or a hole passing through them. The end faces may be generally flat, but need not be. Hence, example of products which may be made by the process of the invention include collapsible thermoplastic tubes with or without a nozzle or outlet, caps for bottles containing liquids, or protective cases for various items for example, electric batteries, pills or powdered, granular or flowable solid products.

According to one aspect of this invention there is provided an apparatus for carrying out a process for the manufacture of a tubular container or the like of thermoplastics material with an end face and a tubular skirt depending therefrom, comprising providing a length of tubular thermoplastics material, sleeving this said length over a mandrel with an end portion of the length extending beyond an end of the mandrel, softening the end portion by heating and inwardly constricting the said end portion, then urging a cap against the said end of the mandrel over the material of the heated and constricted end portion so as to mould the end face of the container between the cap and the end of the mandrel. Preferably the end portion of the length of thermoplastics material does not touch the source of heat. This may be achieved by heating with hot air.

The end face is thus formed from part of the tubular length, the part being softened, constricted, and then moulded to shape.

According to a second aspect of the invention there is provided apparatus for carrying out the above process, comprising a mandrel, means for heating an end portion of tubular thermoplastics material projecting beyond one end of the mandrel, means for urging the heated portion inwardly to constrict it, and a cap spaced from the said end of the mandrel but which can be urged over the said end of the mandrel to mould the end face of the container. The apparatus may include a contacting member to push the heated and softened material inwardly to constrict it. If so it is preferable that the mandrel is rotated about its longitudinal centre line while this is done.

The apparatus may have a central stem, or an axially moveable plunger projecting from the end of the mandrel and about which the heated and softened thermoplastic material is formed and moulded.

In order that the invention may be understood more readily, a number of embodiments will be described with reference to the accompanying drawings, wherein:

FIG. 1 is a diagrammatic section through one form of apparatus for the manufacture of containers;

FIG. 2 is a similar view to FIG. 1, at a later stage of manufacture;

FIG. 3 is a perspective view of a partially formed container;

FIG. 4 is an exploded section through the end portion of a finished container made by the apparatus of FIGS. 1 and 2, the pressing cap and the mandrel;

FIGS. 5, 6 and 7 are diagrammatic sections through a second form of apparatus showing successive stages of construction;

FIGS. 11 and 12 are perspective views showing a further modification;

Figure 8:
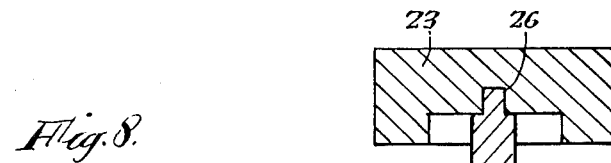
FIG. 8 is an equivalent view to FIG. 7 showing an alternative shape for the rotatable contacting member.

Referring to the drawings, and firstly to FIGS. 1 and 2 the apparatus consists of a mandrel 12 (which does not rotate) a suction cap 11, and hot air jets 14. The suction cap 11 has a central conduit 15 leading to a source of negative pressure which is not shown. The suction cap 11, at its lower face, has a peripheral flange 16 with an inner face 17. The suction cap 11 can be displaced along the common axis towards the mandrel 12.

A length or section 1 of tubular thermoplastics material (suitably of wall thickness 0.2 to 0.5 mm) is sleeved over the mandrel 12. The tubular length 1 has an end portion 4 extending beyond the end 18 of the mandrel 2. The suction cap 11 is placed so that the flange 16 surrounds the extremity of the end portion 4.

At least one face of this portion 4 is heated in order to soften it but not the remainder of the tubular length, i.e., not the part 3 in contact with the mandrel. Preferably, the portion 4 which is heated does not touch the source of heat. This may be achieved as shown, by heating with jets of hot air 14.

Under the action of the heating, the wall of the portion 4 extending beyond the mandrel softens and the extremity 9 widens out as shown in FIG. 1 to bear on the inner face 17 of the suction cap 11. This widening out brings the wall of the portion 4 into contact with the inner wall 17 of the cap 11. The suction cap 11 then closes the top of the chamber 5 inside the portion 4 as shown. This permits the next operation which is the application of sub-atmospheric pressure to the chamber 5 through the conduit 15. This application of sub-atmospheric pressure to the chamber 5 constricts the wall of the portion 4 transversely with respect to the longitudinal axis or centre line of the mandrel 12. The suction cap 11 is also moved part of the way towards the mandrel 12, and the height of the portion 4 of the tubular length which extends beyond the mandrel is reduced, concentrating the mass of thermoplastic material from the portion 4 on to the end of the mandrel. The sub-atmospheric pressure employed will depend on a variety of factors, particularly on the type (e.g. p.v.c., polyethylene) of thermoplastic material being employed, on the wall thickness of the length 1, on the dimensions of the product being made, on the temperature to which the portion 4 has been heated, and on the time constricting operation is to be allowed to take. On constriction, the material of the portion 4 will form longitudinally and radially extending folds 6 as shown in FIG. 3. Finally the suction cap 11 is replaced by a pressing cap 13 which is similar to the suction cap 11 except that it does not have a conduit 15, so that the surface 19 is flat. The cap 13 and the mandrel 12 are moved together to compress and mould the material from the portion 4 so as to form the end face or bottom of the tubular container or other item being manufactured. During the compression and moulding step the material of the heated and softened portion 4 is compressed against the end 18 of the mandrel as shown in FIG. 4. The mandrel is of course cold. With the flat end 18 to the mandrel and the flat surface 19 of the cap 13, a generally flat end wall is obtained. The part 3 of the length 1 (i.e., the part in contact with the sides of the mandrel 12) becomes the skirt or body part of the item produced.

Replacement of the suction cap 11 by the pressing cap 13 may be achieved by moving the mandrel 12 and the tubular length 1 away from the suction cap 11 to a further operating station adjacent the pressing cap 13.

As illustrated in the drawings, the portion 4 of tubular length 1 which extends beyond the mandrel 12 is otherwise unsupported and is disposed in and surrounded by free space during both the heating step and the subsequent constricting step.

Figure 7:
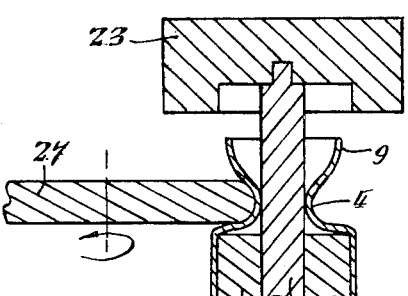

Referring next to FIGS. 5, 6 and 7, a modification of the invention is shown. A mandrel 22 rotating about its centre line is employed. It contains an axially movable plunger 24 maintained above the top 18 of the rest of the mandrel by the resilient action of a spring 25. After the tubular length 1 of thermoplastics material has been sleeved over the mandrel, the top of the plunger 24 is engaged in a recess 26 is the pressing cap 23.

The portion 4 of the tubular length extending beyond the end 18 of the mandrel is softened by heating. Hot air is supplied by the pipe 14 (omitted from FIGS. 6 to 8 for clarity). The portion 4 is then constricted by being pushed by a contacting member 27 which is brought transversely against the portion 4 and then is moved down towards the mandrel to reduce the height 28 of the portion 4, as shown by FIGS. 6 and 7, which show successive stages if this operation, thus concentrating the mass of material of the portion 4 by forming about the plunger 24, and so forming a nozzle in the end face of the tubular receptable.

The contacting member 27 is, as shown, a freely rotatable member, e.g., a knurled wheel or disc, the rotation of which is effected by contact with the rotating tubular length.

The member 27 may have a peripheral rebate 28, as the wheel shown in FIG. 8, and may be free to rotate on a pivot parallel to that of the mandrel, or inclined thereto.

Figure 10:
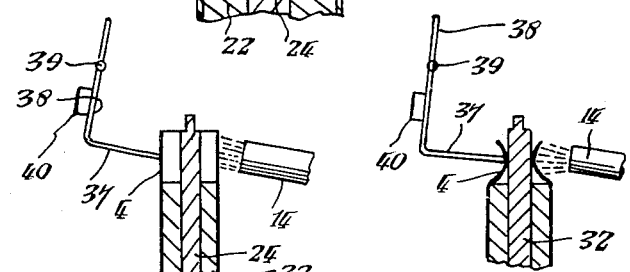
FIGS. 9 and 10 are diagrammatic sections through a further form of apparatus, again showing successive stages of constriction.
Figure 9:
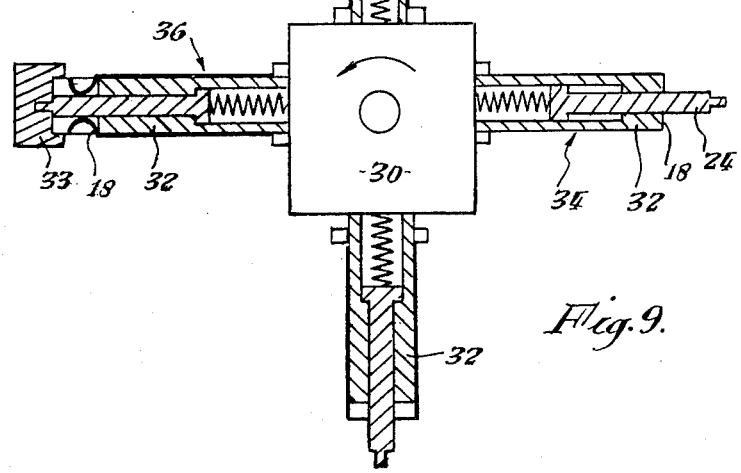

Referring next to FIGS. 9 and 10 a further form of apparatus is shown. The apparatus has a rotatable turret 30 with four mandrels 32 which are carried successively past four operating stations. Each mandrel 32 is similar to the mandrel 22. At the first station 34 a tubular thermoplastic length 1 is sleeved over a mandrel 32. The turret 30 then rotates to carry the mandrel 32 to the next (top) station 35 at which the portion 4 of the thermoplastic length 1 comes against a plate 37. This plate is fast at the end of a shaft 38 pivoted at 39, and biased downwardly by a weight 40. The plate functions as a contacting member. In contradistinction to the member 27 in FIGS. 5 to 8, the plate 37 does not rotate. At this station 35 the mandrel 32 is rotated while the portion 4 is heated and softened. When it becomes soft the plate 37 moves in under the biassing effect of the weight 40 towards the plunger 24 constricting the portion 4 as shown in FIG. 10.

The turrent then rotates again to carry the mandrel 32 to the next station 36 where pressing cap 33 is moved down against the end 18 of the mandrel 32 to carry out the moulding operation. The moulded container is ejected from the mandrel 32 at the fourth station, ejection being carried out in any conventional manner.

Figure 13:
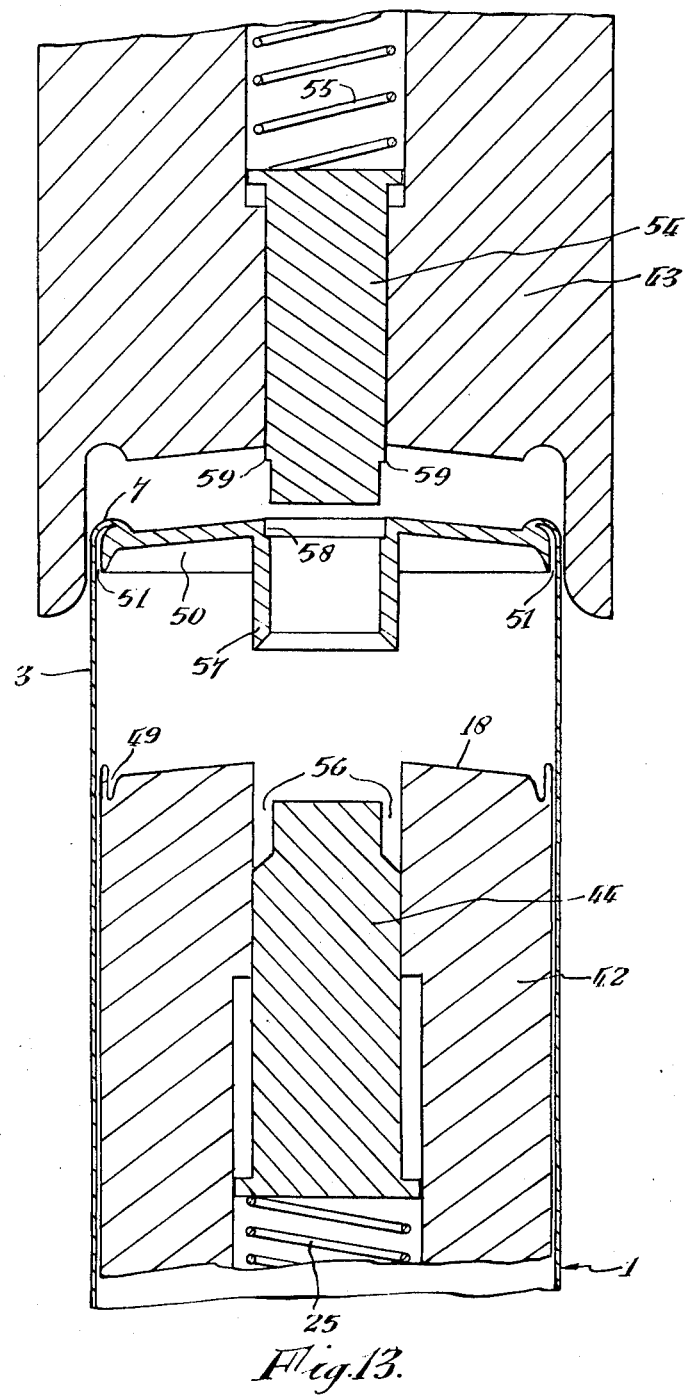
FIG. 13 is an exploded section through the end portion of a finished container made by the apparatus of FIGS. 11 and 12, the pressing cap, and the mandrel.
Figure 14:
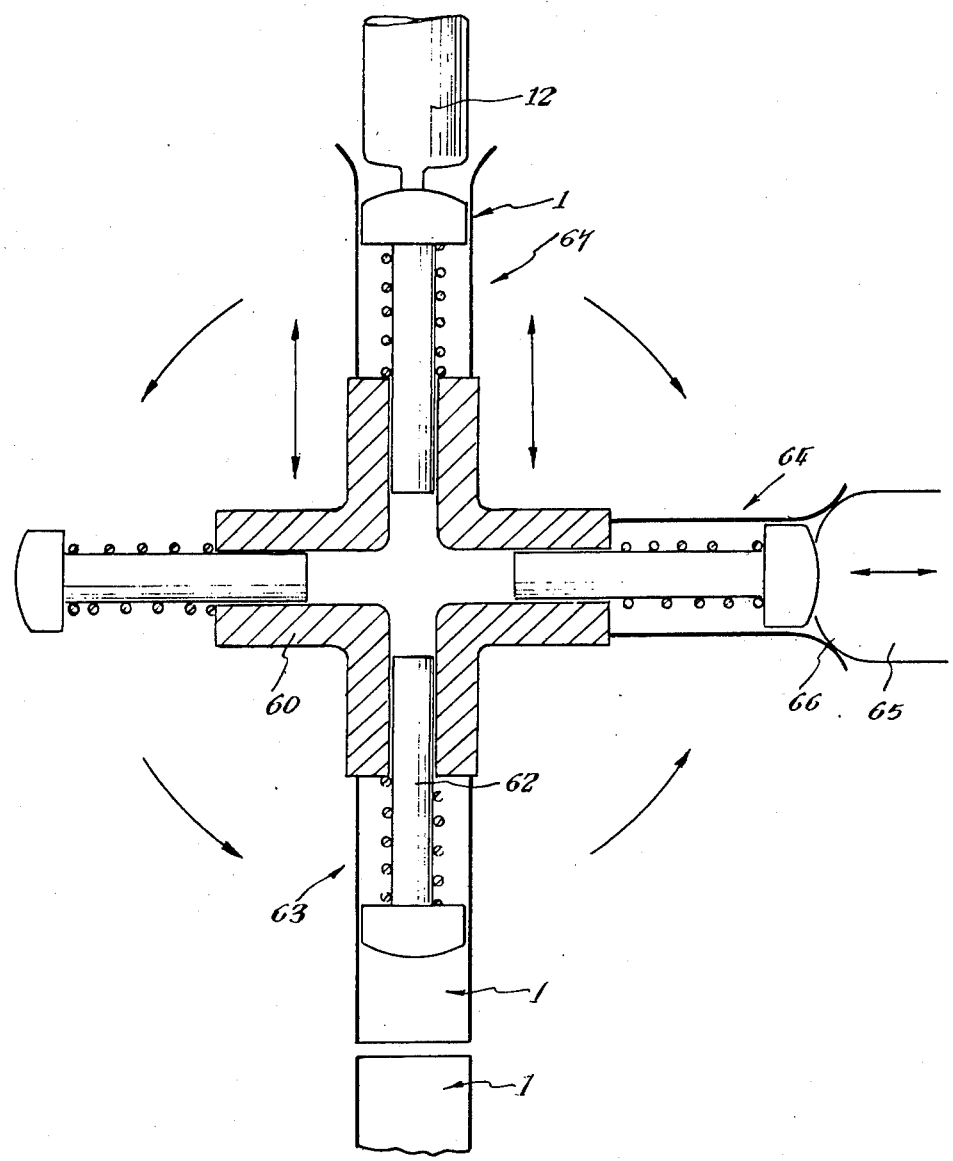
FIG. 14 shows a loading device.

Referring next to FIGS. 11, 12 and 13 a further modification is shown. The apparatus comprises a rotatable turret (not shown) carrying rotatable bearer mandrels 42. Onto one of these is sleeved a thermoplastic tubular length 1 (shown as being transparent) only a portion 3 of which encloses the mandrel whilst a portion 4, which is to be constricted and folded down, extends beyond the mandrel. The mandrel 42 has a central plunger 44 urged outwardly beyond the end 18 of the mandrel by a spring 25.

To the side of the bearer mandrel 42 is arranged a folder 45 which does not rotate with the mandrel and which has a cylindrically concave hollow face 46. This folder is positioned close to the bearer mandrel but without coming into contact with the portion 3 of the thermoplastic tubular length 1 on the mandrel, this being in order to avoid friction.

The folder 45 is made integral with a heater 47 which is mounted on it. This heater 47 is a nozzle blowing hot air, which is fixed on top of the folder 45 and will follow it in its movements to heat and soften the mass of the end portion 4 of the tubular length extending beyond the mandrel.

After softening of this portion 4 of the tubular length the folder 45 will be raised towards the end of the mandrel in order that it may be able to rock over the edge of the mandrel, constricting the heated and softened mass of the portion 4 towards the central plunger 44 of the mandrel 42, and progessively folding down the material of the portion 4 towards the end 18 of the mandrel.

In order to avoid excessive softening of the annular zone of the portion 4 next to the edge of the mandrel, which would risk diminishing the mechanical strength of the length 1 during the course of the folding down, the folder 45 extends slightly beyond the end 18 of the mandrel so as to mask the portion 3 of the themoplastic length which encloses the mandrel and to mask in addition a narrow annular zone 48 beyond the edge of the mandrel 42 in order to screen this annular zone 48 from the heating.

After the material of the portion 4 has been constricted and folded down onto the end 18 of the mandrel around the central plunger 44, the folder 45 is moved away sufficiently to allow the turret to be rotated. This carries the mandrel 42 to a further operating station at which the pressing cap 43 is brought down over the end 18 of the mandrel to mould the end face of the container being manufactured.

The container illustrated (shown in section in FIG. 13) is a case for a dry battery. Around the periphery of the mandrel 42 there is an annular groove 49 and in the moulding operation an inwardly directed annular flange 50 is formed in this groove 49. The flange 50 extends inwardly into the battery case from its end face but is itself free from the wall 3 of the case. No joint forms between the flange 50 and the wall 3 because when moulding is carried out, and after when the moulded product is ejected from the mandrel, the material from the portion 4 is hotter than the mandrel 42 and the wall or skirt 3 which is (or was) around it. A small groove 51 is formed between the flange 50 and the wall 3, as shown. The end 7 of the wall 3 curls around to join the end face at the root of the flange 50. In this way a neat appearance is obtained.

The pressing cap 43 has a central plunger 54 urged towards the mandrel by a spring 55. When the cap 43 and the mandrel 42 are moved together to mould the heated and softened material of the portion 4, the plungers 44 and 54 bear against each other and take up the positions shown in FIG. 13, providing a mould for a central hole in the battery case. On moulding, material from the portion 4 is forced into the groove 56 between the plunger 44 and the mandrel 42, to form a surround 57 for the central hole. A small rebate 58 is formed by the shoulder 59 on the plunger 54.

With any of the forms of apparatus shown, when the portion 4 has been constricted, either by sub-atmospheric pressure or by pushing by a contacting member, the extremity 9 of the section 4 remains turned outwardly as shown in FIG. 3. Any nozzle which is formed is derived from material from the median zone 10 of the end portion 4.

In a further modification of the invention, the tubular receptacle is manufacture from a tubular length of thermo-contracting or heat shrink material i.e., thermoplastics material which contracts on heating.

This contraction can then be employed to constrict the portion extending beyond the mandrel and so concentrate the mass of the material of that portion.

The constriction of the portion of the length extending beyond the mandrel is obtained utilizing a degree of contraction which is less than the contraction potential of the material. The container is then able, after receiving the article which it is required to envelope, to undergo heating for a second time to bring about complete contraction of the material and thereby to closely imprison the said article on the face of which there will be turned down the free end of receptacle, under the effect of this second heating.

Preferably, the article to be protected, for example the body of an electric primary cell i.e., a dry battery has been coated, by dipping or spraying or any other means, with a thermo-melting adhesive i.e., a hot-melt adhesive and the heat applied to the receptacle during the second heating thereof, in order that it may imprison the article whilst finally contracting will simultaneously put the fusible adhesive into the sticky condition, thereby achieving fluid-tight and final adhesion due to union of contacting faces of the articles to be protected.

This can be employed to provide a seal between cases for electric dry batteries and the metal bodes of these. These metal bodes are very readily attacked and perforated by the components of the battery. A plastics case around the battery and sealed to it can prevent undesirable leakage.

The apparatus shown in FIG. 12 may be used to facilitate the sleeving of each length 1 onto the mandrel 12, 22, 32 or 42. The apparatus has a rotating turrent 60 carrying four conveyor mandrels 62 successively past operating stations. Thermoplastic lengths 1 are threaded onto one of the conveyor mandrels 62 at one station 63. At the next station 64 a presser element 65 with a convex end, in this case a spherical end 66, is shown. This is pushed against the free end of each length 1. The diameter of the presser element 65 is greater than that of the length 1, so that the free end part of each length 1 becomes flared out. This end part is not the end portion to be turned into an end face, but is at the opposite end thereto.

The flaring out facilitates the sleeving on to the mandrel 12, 22, 32 or 42 by preventing the end of the length 1 butting against the end 18 of the mandrel 12, 22, 32 or 42 at the moment of sleeving on. Sleeving on is carried out at the next station 67 as shown.

I claim:
1. Apparatus for the manufacture of a tubular product of thermoplastics material, said product comprising an end face and a tubular skirt extending therefrom, the apparatus comprising:
   a mandrel, having a free end, for receiving a length of tubular thermoplastic material sleeved thereon with an end portion adjacent one end of said length of material projecting beyond said free end of said mandrel such that, in the operating position of said mandrel, at least a major part of the said projecting end portion of said length is otherwise unsupported and is disposed in and surrounded by a free space;
   heating means located in operative relationship to said mandrel for supplying heat into said free space to heat said otherwise unsupported end portion of said length;
   constrictor means, located in operative relationship to said mandrel, for uring the heated and otherwise unsupported end portion inwardly to effect constriction thereof while preserving said free space;
   a cap initially disposed adjacent to and spaced from said end portion of said tubular material;
   and means, operative after said constriction of said heated end portion, for relatively moving said cap and said mandrel from a first, inoperative position in which said cap is spaced from said free end of said mandrel to a second, operative position adjacent to said free end wherein said cap is urged into engagement with said heated end portion to cause moulding of the material thereof between said cap and said free end to form the end face of the tubular product.

2. Apparatus according to claim 1 wherein said heating means comprises at least one pipe for supplying hot air against the projecting said end portion of said length of tubular thermoplastic material.

3. Apparatus according to claim 1 wherein said constrictor means comprises means for urging inwardly the end portion of said length between the said free end of the mandrel and the said end of said length to form a constricted neck between two comparatively wider zones of said end portion, said cap, upon being moved to said second position, causing doubling back outwardly relative to the neck the material of the said zone which is adjacent the end of the length.

4. Apparatus according to claim 1 wherein said constrictor means comprises a contacting member movable within said free space and which contacts part only the circumference of the projecting said end portion, the apparatus including drive means for rotating said mandrel about its longitudinal center line and means for simultaneously moving said contacting member inwardly towards said longitudinal center line against the heated said end portion to effect constriction thereof.

5. Apparatus according to claim 4 wherein said mandrel comprises a central stem projecting from said free end of said mandrel, whereby said contacting member effects constriction of the heated said end portion of said length around said stem, and wherein said means for moving said cap to the said second position thereof causes moulding the material of the heated said end portion around said stem as said cap is moved to the said second position thereof.

6. Apparatus according to claim 5 wherein said stem comprises an axially movable plunger and said mandrel comprises a spring for urging said plunger towards said cap, said means for moving said cap causing urging of said plunger into said mandrel against said spring while said cap is moved to said second position thereof.

7. Apparatus according to claim 5 wherein the means for moving said contacting member towards the longitudinal center line of said mandrel is also operative to move said contacting member towards said free end of said mandrel to form the material of the heated said end portion around said stem.

8. Apparatus according to claim 1 wherein said constrictor means comprises a suction cap which surrounds a zone of said end portion adjacent the end of the length in sealing relation to said zone, said apparatus further comprising means defining a suction duct extending through said suction cap, and means for withdrawing air from said end portion of said length through said suction duct when said suction cap is in the said first position thereof.

9. Apparatus according to claim 1 wherein said constrictor means comprises a folder movable within said free space, said folder having a hollow surface which, in an initial position of the folder, wherein the mandrel is in the said operating position thereof, lies closely adjacent the outer surface of said length of tubular thermoplastic material and extends around part only of the circumference of said length, the apparatus including drive means for rotating said mandrel about the longitudinal center line thereof and rocking means for simultaneously rocking said folder over the edge of said free end of said mandrel to effect constriction of the heated said end portion and concentrate the material thereof onto said free end.

10. Apparatus for the manufacture of a tubular product from a length of tubular thermoplastic material, said product comprising an end face and a tubular skirt extending therefrom, the apparatus comprising:
a mandrel for receiving said length of tubular thermoplastics material sleeved thereon, said mandrel having a free end and slab length having an end portion adjacent one end thereof which projects beyond said free end of said mandrel when said length is sleeved on said mandrel so that, in the operating position of said mandrel, a major part of the projecting said end portion is disposed in and surrounded by a free space;
drive means for rotating said mandrel;
a folder movable within said free space;
a pipe for supplying hot air, said pipe being mounted on said folder so that the said folder is disposed between said pipe and said mandrel, said pipe being positioned to deliver said hot air against said projecting end portion to heat said projecting end portion and thereby soften the material thereof, said folder having a hollow surface which, in an initial position of said folder where said mandrel is in the said operating position thereof, lies closely adjacent the outer surface of said length and extends around part only of the circumference of said length;
folder rocking means for rocking said folder from the initial position thereof over the edge of said free end of said mandrel against the heated said end portion, while said mandrel is rotated by said drive means, so as to constrict the heated said end portion and concentrate the material thereon onto said free end of said mandrel;
a cap initially disposed adjacent to and spaced from said end portion of said tubular material;
and means, operative subsequent to said constriction of said heated end portion, for relatively moving said cap and said mandrel from a first, inoperative position which said cap is spaced from said free end of said mandrel to a second, operative position adjacent said free end, wherein said cap is urged into engagement with said heated end to cause moulding of the material thereof between said cap and said free and to form the end face of the container.

11. Apparatus according to claim 10 wherein, in saidinitial position of said folder, said folder extends past said free end of said mandrel, whereby a zone of said end portion adjacent said free end of said mandrel is masked by said folder from the hot air from said pipe, said folder rocking means moving said folder axially parallel to the center line of said mandrel an additional distance past said free end of said mandrel, in addition to rocking said folder over the edge of said free end.

12. Apparatus according to claim 10 wherein said mandrel comprises a central stem projecting from said free end of said mandrel whereby said folder effects constriction of the heated said end portion of said length around said stem, and wherein said means for moving said cap into the said second position thereof causes moulding of the material of the heated said end portion around said stem as said cap is moved to the said second position thereof.

13. Apparatus according to claim 1, comprising, in addition to said mandrel, at least one conveyor mandrel shorter than said length of thermoplastic material and having a plurality of operating stations, one of said operating stations being proximate said free end of the first said mandrel;
a presser element located proximate to another said operating station of said conveyor mandrel, said presser element being of diameter greater than that of a said length of tubular thermoplastics material and having a convex end;
drive means for moving said conveyor mandrel between said operating station adjacent said free end and said operating station adjacent said presser element, and drive means for said presser element for urging said convex end of said presser element against an end of said conveyor mandrel, such that when a said length of tubular thermoplastic material is initially threaded onto said conveyor mandrel, the drive means for the presser element urges the convex end of the presser element against the end of the conveyor mandrel while the tubular length is threaded thereon so as to flare an end portion thereof, the drive means for the conveyor mandrel moving the conveyor mandrel to the operating station proximate the free end of the first said mandrel, said length being transferred at the last mentioned station to the first said mandrel, the flared end portion thereof assisting in sleeving the said length onto the first said mandrel.

* * * * *